United States Patent
Torrione et al.

(10) Patent No.: US 12,395,610 B2
(45) Date of Patent: Aug. 19, 2025

(54) SYSTEMS AND METHODS FOR PERSONNEL LOCATION AT A DRILLING SITE

(71) Applicant: HELMERICH & PAYNE TECHNOLOGIES, LLC, Tulsa, OK (US)

(72) Inventors: Peter A. Torrione, Durham, NC (US); Kenneth D. Morton, Jr., Durham, NC (US)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 0 days.

(21) Appl. No.: 18/412,424

(22) Filed: Jan. 12, 2024

(65) Prior Publication Data
US 2024/0155080 A1 May 9, 2024

Related U.S. Application Data

(63) Continuation of application No. 17/176,825, filed on Feb. 16, 2021, now Pat. No. 11,917,333, which is a (Continued)

(51) Int. Cl.
*H04N 7/18* (2006.01)
*E21B 44/00* (2006.01)
(Continued)

(52) U.S. Cl.
CPC ............. *H04N 7/181* (2013.01); *E21B 44/00* (2013.01); *G05B 19/042* (2013.01);
(Continued)

(58) Field of Classification Search
CPC ........ H04N 7/181; G06V 20/52; E21B 44/00; G05B 19/042; G05B 19/048
(Continued)

(56) References Cited

U.S. PATENT DOCUMENTS

| 4,610,005 A | 9/1986 | Utasi |
| 6,256,046 B1 | 7/2001 | Waters et al. |
| (Continued) | | |

FOREIGN PATENT DOCUMENTS

| WO | 2016147045 A1 | 9/2016 |
| WO | 2017042677 A1 | 3/2017 |
| (Continued) | | |

OTHER PUBLICATIONS

U.S. Appl. No. 17/176,825, "Corrected Notice of Allowability", Jan. 26, 2024, 3 pages.
(Continued)

*Primary Examiner* — Sath V Perungavoor
*Assistant Examiner* — Kristin Dobbs
(74) *Attorney, Agent, or Firm* — Kilpatrick Townsend & Stockton LLP

(57) ABSTRACT

Systems and methods for determining the location of personnel on a drilling site. A computer vision system can automatically identify and determine the locations of personnel on a drilling site, can generate a confidence map of the locations, and can display the locations of the personnel on a map of the drilling site. The system and methods also include taking corrective action when a person's location is determined to be unsafe, such as by inhibiting or causing automated actions with respect to machinery and equipment at the drilling site. The systems and methods may include the use of multiple cameras or video sources located at the drilling site and may be coupled to a control system to control machinery or equipment at the drilling site.

19 Claims, 2 Drawing Sheets

Related U.S. Application Data continuation of application No. 14/938,467, filed on Nov. 11, 2015, now Pat. No. 10,958,877.

(60) Provisional application No. 62/078,569, filed on Nov. 12, 2014.

(51) Int. Cl.
  *G05B 19/042* (2006.01)
  *G05B 19/048* (2006.01)
  *G06V 20/52* (2022.01)

(52) U.S. Cl.
  CPC ............ *G05B 19/048* (2013.01); *G06V 20/52* (2022.01); *G05B 2219/24097* (2013.01); *G05B 2219/24215* (2013.01); *G05B 2219/49141* (2013.01)

(58) Field of Classification Search
  USPC .......................................................... 348/159
  See application file for complete search history.

(56) References Cited

U.S. PATENT DOCUMENTS

| | | |
|---|---|---|
| 6,469,734 B1 | 10/2002 | Nichani et al. |
| 6,646,676 B1 | 11/2003 | DaGraca et al. |
| 7,874,351 B2 | 1/2011 | Hampton et al. |
| 7,933,166 B2 | 4/2011 | Goodman |
| 8,218,826 B2 | 7/2012 | Ciglenec et al. |
| 8,233,667 B2 | 7/2012 | Helgason et al. |
| 8,363,101 B2 | 1/2013 | Gschwendtner et al. |
| 8,395,661 B1 | 3/2013 | Olsson et al. |
| 8,547,428 B1 | 10/2013 | Olsson et al. |
| 8,622,128 B2 | 1/2014 | Hegeman |
| 8,812,236 B1 | 8/2014 | Freeman et al. |
| 8,873,806 B2 | 10/2014 | Kiest, Jr. |
| 9,041,794 B1 | 5/2015 | Olsson et al. |
| 9,134,255 B1 | 9/2015 | Olsson et al. |
| 9,279,319 B2 | 3/2016 | Savage |
| 9,410,877 B2 | 8/2016 | Maxey et al. |
| 9,464,492 B2 | 10/2016 | Austefjord et al. |
| 9,518,817 B2 | 12/2016 | Baba et al. |
| 9,651,468 B2 | 5/2017 | Rowe et al. |
| 9,664,011 B2 | 5/2017 | Kruspe et al. |
| 9,677,882 B2 | 6/2017 | Kiest, Jr. |
| 9,706,185 B2 | 7/2017 | Ellis |
| 9,869,145 B2 | 1/2018 | Jones et al. |
| 9,912,918 B2 | 3/2018 | Samuel |
| 9,915,112 B2 | 3/2018 | Geehan et al. |
| 10,227,859 B2 | 3/2019 | Richards et al. |
| 10,328,503 B2 | 6/2019 | Osawa et al. |
| 10,567,735 B2 | 2/2020 | Ellis et al. |
| 10,958,877 B2 | 3/2021 | Torrione et al. |
| 11,917,333 B2 | 2/2024 | Torrione et al. |
| 2007/0182818 A1* | 8/2007 | Buehler ............ G08B 13/19608 348/143 |
| 2009/0159294 A1 | 6/2009 | Abdollahi et al. |
| 2012/0267168 A1 | 10/2012 | Grubb et al. |
| 2013/0236064 A1 | 9/2013 | Li et al. |
| 2013/0265409 A1 | 10/2013 | Tjhang et al. |
| 2013/0275100 A1* | 10/2013 | Ellis ........................ E21B 19/20 703/2 |
| 2014/0002617 A1 | 1/2014 | Zhang et al. |
| 2014/0326505 A1 | 11/2014 | Davis et al. |
| 2014/0333754 A1 | 11/2014 | Graves et al. |
| 2015/0100233 A1 | 4/2015 | Pacholski et al. |
| 2015/0138337 A1 | 5/2015 | Tjhang et al. |
| 2015/0218936 A1 | 8/2015 | Maher et al. |
| 2017/0089153 A1 | 3/2017 | Teodorescu |
| 2017/0161885 A1 | 6/2017 | Parmeshwar et al. |
| 2017/0167853 A1 | 6/2017 | Zheng et al. |
| 2017/0322086 A1 | 11/2017 | Luharuka et al. |
| 2018/0180524 A1 | 6/2018 | Francois et al. |
| 2019/0100988 A1 | 4/2019 | Ellis et al. |
| 2019/0102612 A1 | 4/2019 | Takemoto et al. |
| 2019/0136650 A1 | 5/2019 | Zheng et al. |
| 2019/0141294 A1 | 5/2019 | Thorn et al. |
| 2019/0206068 A1 | 7/2019 | Stark et al. |

FOREIGN PATENT DOCUMENTS

| | | |
|---|---|---|
| WO | 2017132297 A2 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

"What is Perspective View?", Computer Hope, Available Online at: https://www.computerhope.com/jargon/p/perspect.htm, Accessed from Internet on Oct. 15, 2020, pp. 1-2.

"You Want What Kind of a View?", Dakatec Incorporated Patent Drawings, Available Online at: http://www.dakatec.com/you-want-what-kind-of-a-view/, Accessed from Internet on Oct. 15, 2020, pp. 1-2.

U.S. Appl. No. 14/938,467 , "Advisory Action", Jul. 30, 2019, 4 pages.

U.S. Appl. No. 14/938,467 , "Final Office Action", Oct. 6, 2017, 14 pages.

U.S. Appl. No. 14/938,467 , "Final Office Action", Feb. 11, 2019, 20 pages.

U.S. Appl. No. 14/938,467 , "Final Office Action", Jun. 26, 2020, 22 pages.

U.S. Appl. No. 14/938,467 , "Non-Final Office Action", Oct. 4, 2016, 12 pages.

U.S. Appl. No. 14/938,467 , "Non-Final Office Action", Apr. 6, 2018, 19 pages.

U.S. Appl. No. 14/938,467 , "Non-Final Office Action", Mar. 6, 2020, 20 pages.

U.S. Appl. No. 14/938,467 , "Notice of Allowance", Nov. 17, 2020, 7 pages.

U.S. Appl. No. 17/176,825 , "Non-Final Office Action", Mar. 16, 2023, 16 pages.

U.S. Appl. No. 17/176,825 , "Notice of Allowance", Oct. 12, 2023, 8 pages.

CA Application No. 2,967,771 , "Notice of Allowance", Sep. 13, 2022, 1 page.

CA Application No. 2,967,771 , "Office Action", Feb. 20, 2023, 3 pages.

CA Application No. 2,967,771 , "Office Action", Nov. 23, 2023, 3 pages.

International Application No. PCT/US2015/060174 , "International Search Report and Written Opinion", Jan. 27, 2016, 12 pages.

* cited by examiner

SYSTEMS AND METHODS FOR PERSONNEL LOCATION AT A DRILLING SITE

CROSS-REFERENCE TO RELATED APPLICATIONS

This application is a continuation and claims the benefit of priority of U.S. patent application Ser. No. 17/176,825, filed on Feb. 16, 2021, which is a continuation and claims the benefit of priority of U.S. patent application Ser. No. 14/938,467, filed on Nov. 11, 2015, which claims the benefit of priority of U.S. Provisional Patent Application Ser. No. 62/078,569, filed on Nov. 12, 2014, both of which are hereby incorporated by reference in their entireties.

FIELD OF THE INVENTION

The invention relates to systems and methods for inhibiting or causing automated actions based on person locations estimated from multiple video sources.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation, and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

A long standing goal in many industrial settings is the automation of machinery to improve speed and efficiency. However, automated machinery motion and other automated actions in industrial settings can pose significant risks to personnel in these environments. Accurate information about the locations of persons could help to prohibit certain actions at certain times when people may be in harm's way.

Current technologies for detecting person location (e.g., RFID, manual person location reporting, lock-out keys) all require personnel to take specific actions to ensure their locations are known. These actions (e.g., wearing the RFID, reporting your location, using your key) represent an unnecessary failure point, which results in preventable injuries. In contrast to these approaches, video data from multiple cameras can provide accurate person location information without requiring any actions on the part of the people in the scene, and in an unobtrusive manner. Therefore, there is a need for a video-based technique for tracking person locations in an industrial environment and the incorporation of that information into automated system controls to prohibit certain activities when personnel might be in danger.

DETAILED DESCRIPTION

Figure 1:
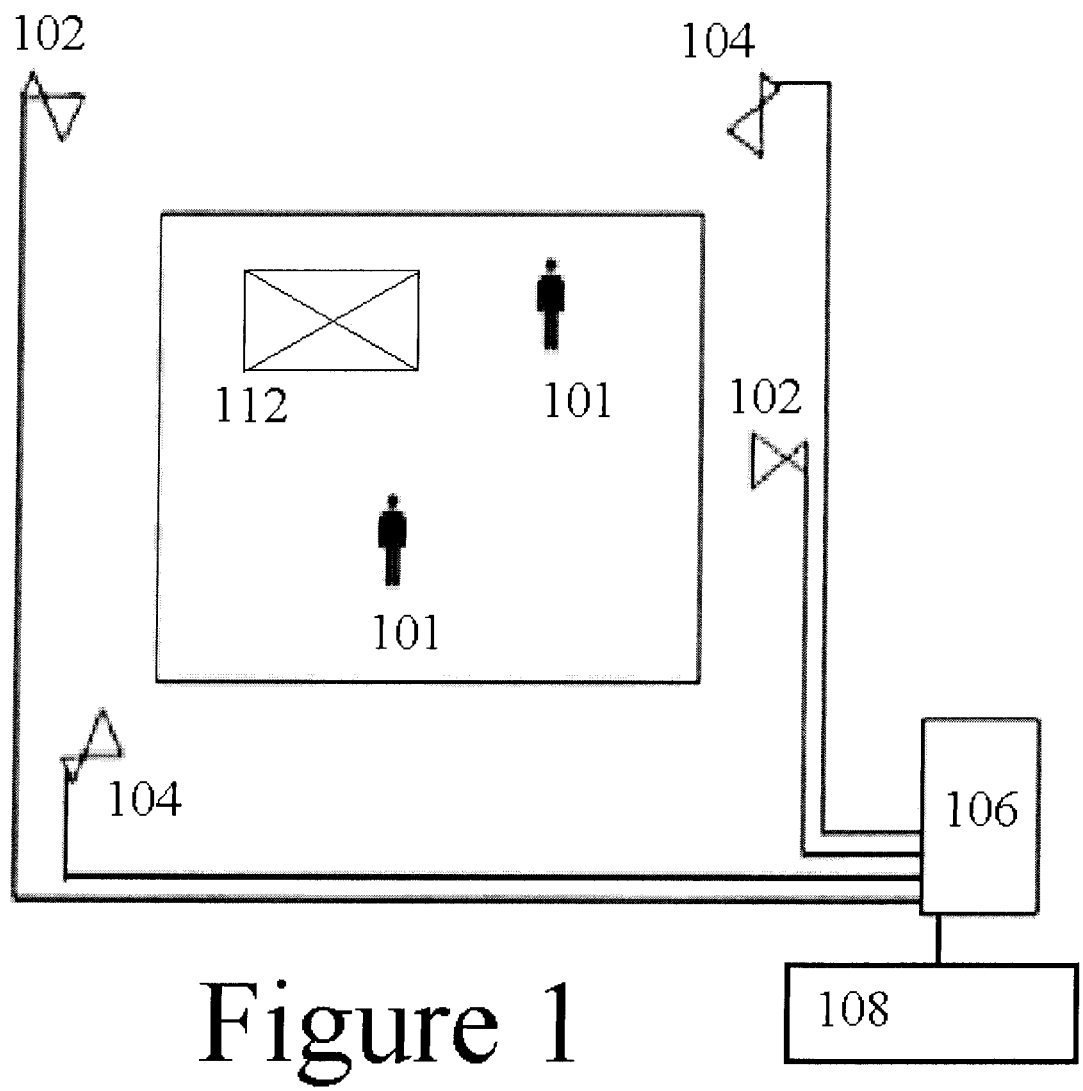
FIG. 1 depicts one of many embodiments of a system involving multiple video sources cameras for monitoring personnel location.

The Personnel Video Monitoring system, "PVM", consists of several parts. The PVM may include multiple individual video sources 102, each of which may or may not view the same region, and each of which may have been calibrated so its location and pose relative to the other video source 102 is known. Each video source 102 may be a camera 104. Each camera 104 may contain or be connected to a computer 106 which performs person detection on the scene viewed by that camera 104 and may generate a "bounding box" (or other additional information) for each person 101 in each frame. Each camera 104 may transmit each bounding box to a central computing resource 106, which aggregates possible person 101 locations across all of the cameras 104 (using each camera's bounding boxes, location, and pose information) to estimate actual person 101 locations via triangulation, and false-alarm rejection. This process results in a final list of person 101 coordinates in 2- or 3-Dimensions. The resulting information about person 101 locations may then be presented to the end-user on a 2- or 3-D visualization of the environment, with specific icons representing each person's 101 location or provided to machinery control systems 108 to cause or inhibit certain automated activities. These automated activities often involve the automated movement of mechanical equipment 112 which is capable of injuring a person 101 who is in the vicinity. Examples of such equipment 112 could be conveyors, cranes, hoists, pumps, drilling equipment, carts, sleds, elevators, winches, top drives, industrial equipment and many others.

For calibration, any number of fiducial objects with known X, Y, and Z locations can be used within the scene. Typical fiducial objects include a grid of black and white squares, or 3-dimensional objects with multiple distinctly colored parts. Alternatively, calibration can be accomplished with pre-existing fiducials in the scene (e.g., known locations of machinery). Points on these fiducials may be detected automatically, or manually identified (by clicking) in each camera view. Calibration can then proceed using any of a number of camera parameter optimization techniques (e.g., linear or non-linear least-squares, batch-least-squares, etc.).

Any of a number of person detection algorithms can be utilized on a per-camera basis (e.g., HOG or ICF). Different algorithms provide different performances in terms of probability of detecting a person as well as probability of generating a bounding box when no person is present. Each approach also provides different sensitivities to lighting and occlusion and different algorithms have different computational requirements. As a result, the choice of person detection algorithm can be accomplished on a per-installation basis.

Person detections may consist of a "bounding box" surrounding the person in each frame, as well as additional information (e.g., the index of the current camera with the detection, features extracted from the image around the person, the raw [RGB] data inside and immediately surrounding the bounding box, the time and frame number of the person detection, other meta-data, as well as various other parameters estimated during the person detection process).

Person detection data (bounding boxes, RGB color data, or associated meta-data) may be transferred to the central tracking computer 106 using TCP/IP, UDP, or any other suitable data transfer protocol.

Person detections can be aggregated temporally within a camera 104 to reduce false alarms, and improve the probability of detection by keeping track of person detection confidences over time within a camera view. This can prevent spurious false alarms, and help to improve detection of difficult-to-see persons.

The bounding box from each camera 104 may be combined with the information about each camera's pose and location to provide a global coordinate estimate of the person's location using either bearing-only or joint bearing-and-range-based triangulation.

For horizontally oriented cameras 104, the only information about a person's distance from the camera is due to the height of the detected bounding box. This information may be combined with the bounding box location to estimate both a distance and a scale, though the box height is often too noisy to provide robust range estimation.

For cameras 104 oriented somewhat vertically with respect to the horizon, person range can be estimated using the centroid of the person's bounding-box, and assuming that the mid-point of the person is in some reasonable range (e.g., waistline is above 24" and below 50"), which enables joint bearings (angle) and range measurements.

The bearings and range information from each camera 104 may then be superimposed on a grid-representation of the area under consideration. This grid may take the form of a 2-D matrix of points, where each point represents a square region with nominal side length (e.g., 2", 6", 1') (the grid can be adaptively re-sized to account for additional cameras or to increase processing speed). Each detection from each camera 104 counts as a "vote" into all of the grid squares within a given distance of the line segment generated by projecting the bounding box centroid into the plan-view. Votes are aggregated across all the cameras 104 and all the detections. The resulting vote plan-view may be smoothed using a Gaussian filter whose size is proportional to the expected size of persons in the scene. This smoothed image represents the spatial confidence map for person locations in the current frame.

The resulting current time spatial confidence map, c(t), is combined with the confidence map from the previous frame, c(t−1), in an IIR manner, to form the final confidence map, C(t). e.g., $$C(t)=ac(t)+1-a)c(t-1),$$

where a∈[0,1] is chosen to provide adequate tradeoffs between fast adaptation (large a) and false alarm reduction (small a).

The final confidence map, C(t), is then transformed into discrete person locations using local maxima of the 2- or 3-D surface. Consistent person identification may be accomplished using Kalman filtering on the resulting discrete person locations over time, where the identity of each person is attached to the most likely current local maxima given the prediction of the Kalman filter. Persons can appear and be removed from the scene when the likelihood of their track is reduced below a threshold. Other tracking algorithms can be used in place of the Kalman filter, including particle filters, MCMC tracking approaches, and others.

Various ad-hoc parameters are used to enhance the person detection and tracking. For example, realistic human motion is highly constrained (persons are extremely unlikely to move faster than 40 km/h, or about 11 m/s). These velocity constraints can therefore be leveraged in the tracking by invalidating any human track that involves jumps in excess of ⅓ meters per frame (in a 30 Hz video), for example.

Persistent clutter (objects in the scene that cause person-detectors to "false alarm") can pose a serious problem for accurate person tracking and localization. In the case of static background objects, performance may be significantly improved by incorporating either change-detection (via adaptive Gaussian Mixture Models), or static clutter rejection techniques (by training a person detection classifier to reject instances of the static background under consideration). These options are available at the user's specification and may be accessible from the main graphical user interface (see below).

Determining when a new person has entered or left the scene can be accomplished in a number of ways. As discussed above, persons can be removed from the scene when the likelihood of their track has decreased below a certain level, or no person detections in any camera corresponding to that person have occurred in a given time. Person birth/death processes can also take into account egress and ingress points on the spatial rig representation. For example, persons may be expected to enter and exit the spatial map near doors, or stairwells, but are unlikely to disappear from the scene when standing in the middle of the room. These regions are used in the person tracking/birth/death processing, and may be set by the user through the graphical user interface.

A graphical user interface 120 (GUI) may enable the end-user to visualize the resulting person locations in the individual video streams, as well as in a 2- or 3-D representation of the space. A preferred embodiment of a GUI may consist of several parts, including a row of video feeds from each camera in the PVM system. These images may be "clickable". Clicking any video stream changes the main video visualization to correspond to that camera. This action makes the camera selected the "active camera".

A GUI 120 may also include a main video visualization showing the video from the active camera. Each video may be enhanced by drawing the detected bounding boxes for all person detections, as well as ellipses representing the persons estimated location projected onto the ground. The ellipses are generated by projecting a fixed-radius circle around each person location onto the ground plane using the camera parameters. Each circle on each detected person is assigned a color, and the color-to-person relationship is maintained throughout the video (e.g., the person with the green circle will always be represented by a green circle). The radius, thickness, and transparency of each person identification circle is proportional to the certainty with which that person is currently localized. As a person leaves a scene, or is occluded, the circle corresponding to their location will increase in size, decrease in thickness, and increase in transparency, until it disappears and the person is "lost".

A plan-view or 3-D map of the area under surveillance may show the locations of the persons in world-coordinates, as well as the locations of the cameras. Persons are represented as simplified icons and the colors in the map may be chosen to match the circles drawn around each person in the main frame. In the plan-view visualization, the active camera is identified by changing its color (e.g., the active camera icon may be red while the other camera icons are black).

The GUI may also include various options for saving, loading, exporting, starting, stopping, and changing parameters of the UI.

In addition, depending on needs, the outputs of the person localization information may be coupled into SCADA control systems, and utilized to either raise an alarm 110 if a person is in close proximity to moving equipment, or to inhibit automated actions when a person is in too close proximity to the equipment.

In FIG. 1, video sources 102 and cameras 104 are mounted with arbitrary pan, tilt and/or zoom settings in arbitrary locations around the scene to be surveyed. In a preferred embodiment, at least three cameras 104 should be able to "view" each spatial location where people 101 should be tracked and personnel at the maximum distance in each camera 104 view should be at least 64 pixels in height. Complete overlap between camera 104 views is not necessary as long as at least three cameras 104 are able to view each spatial location where people should be tracked. Given enough cameras 104, different cameras 104 can view completely different regions. These cameras 104 are connected to processor 106 which is configured to monitor the location of the personnel 101 as discussed. Processor 106 is also connected to machinery control system 108 which is configured to initiate or interrupt any automated actions of equipment 112 based on the location of the personnel 101.

Figure 2:
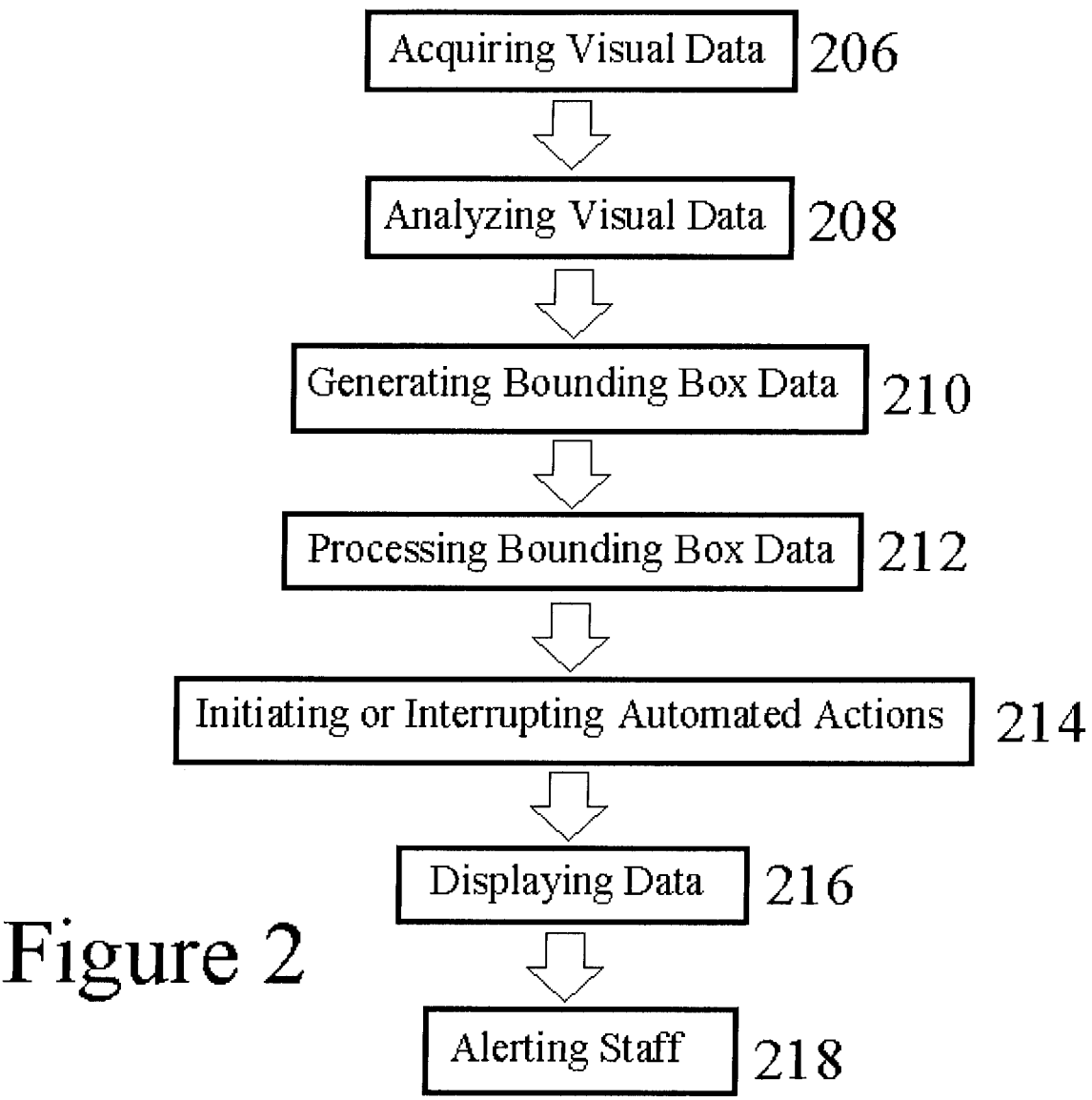
FIG. 2 depicts a potential series of steps involved in a method for monitoring person location and controlling machinery accordingly.

In FIG. 2, the steps of potential method of controlling automated equipment 112 is described. The method includes acquiring visual data, step 206, analyzing visual data, step 208, generating bounding box data, step 210, processing bounding box data, step 212, initiating or interrupting automated actions, step 214, displaying data, step 216 and alerting staff, step 218. Other embodiments may use some or all of these steps to achieve the primary objective of initiating or interrupting automated action based on the location of personnel.

Disclosed embodiments relate to a system for inhibiting or causing automated actions based on estimated person locations. The system may include multiple video sources 102 which are configured to detect the location of one or more persons 101. The video source 102 may be calibrated for a known location and pose. The system also includes at least one processor 106 operably connected to the calibrated video sources 102. The processor 106 aggregates possible person 101 locations. The system may also include a machinery control system 108 which is configured to initiate or interrupt automated activities in response to possible person 101 locations.

Alternative embodiments of the system may also include a visualization of the environment presented to an end user, and/or an alarm 110 for alerting staff to the occurrence of a pre-determined condition. Certain embodiments will utilize a plurality of video sources 102 which are combined to provide enhanced person location confidence. In many embodiments the at least one video source 102 will be a camera 104.

Another disclosed embodiment relates to a method for inhibiting or causing automated actions based on estimated person locations. The method may include the steps of acquiring visual data 206 from at least one video source, analyzing said visual data 208 and inhibiting or causing automated actions 214 based on said data using a machinery control system. Additional embodiments may also include the steps of displaying the acquired or analyzed data 216, alerting staff to the occurrence of a pre-determined condition 218, generating bounding box data 210 for at least one person in a frame and/or processing bounding box data 212 to determine person locations via triangulation.

That which is claimed is:

1. A computer vision system for personnel location on a drilling site, the system comprising:
   at least one camera; and
   at least one processor operably connected to the at least one camera and configured to receive visual data from the at least one camera, wherein the visual data comprises a field of view of at least a portion of the drilling site, and wherein the processor is further configured to:
   detect an object as personnel in the field of view from the visual data;
   estimate a location of the personnel responsive to the detection of the object as personnel;
   track the location of the personnel as the personnel moves within the field of view;
   generate a display comprising at least one marking corresponding to the tracked location of the personnel; and
   remove the at least one marking from the display when no personnel detections have occurred within a time period.

2. The computer vision system of claim 1, wherein the at least one processor is configured to detect the object as personnel based on the detected object meeting one or more conditions.

3. The computer vision system of claim 2, wherein the one or more conditions comprises at least one of an estimated mid-point of the personnel being within a predefined mid-point range or an estimated velocity of the object being within a predefined velocity range.

4. The computer vision system of claim 1, wherein the processor is further configured to provide a confidence map of the location of the personnel.

5. The computer vision system of claim 1, wherein the display further comprises a display of the drilling site, and wherein the at least one marking is on the display of the drilling site.

6. The computer vision system of claim 1, wherein the at least one marking comprises a first marking representing the detected personnel and a second marking representing an estimated location of the detected personnel on a ground plane.

7. The computer vision system of claim 1, wherein the processor is configured to detect a plurality of objects as a plurality of personnel, and wherein the processor is configured to generate the display with a plurality of unique markings, each unique marking associated with a corresponding detected personnel.

8. The computer vision system of claim 1, wherein the processor is configured to change a characteristic of the at least one marking based on the tracked location of the personnel.

9. The computer vision system of claim 1, wherein the processor is configured to detect the object as the personnel based on a detected egress or ingress point in the field of view.

10. A method for locating personnel on a drilling site with computer vision, the method comprising:
    acquiring, by a computer vision system, visual data from at least one camera positioned on a drilling site, wherein the drilling site comprises a drilling rig and one or more pieces of equipment associated with the drilling rig;

analyzing, by the computer vision system, the visual data from the at least one camera, the visual data comprising a field of view of at least a portion of the drilling site;

identifying, by the computer vision system, an object as personnel in the field of view from the visual data;

estimating, by the computer vision system, a location of the personnel responsive to the identification of the object as personnel;

tracking, by the computer vision system, the location of the personnel as the personnel moves within the field of view; and generating, by the computer vision system, a display comprising at least one marking corresponding to the tracked location of the personnel, wherein identifying the object as the personnel is based on the detected object meeting one or more conditions, and wherein the one or more conditions comprises at least one of an estimated mid-point of the personnel being within a predefined mid-point range or an estimated velocity of the object being within a predefined velocity range.

11. The method of claim 10, further comprising initiating, by the computer vision system, a corrective action based on the estimated location of the personnel.

12. The method of claim 10, further comprising removing the at least one marking from the display when no personnel detections have occurred within a time period.

13. The method of claim 10, wherein the at least one marking comprises a first marking representing the detected personnel and a second marking representing an estimated location of the detected personnel on a ground plane.

14. The method of claim 10, further comprising changing a characteristic of the at least one marking based on the tracked location of the personnel.

15. The method of claim 10, wherein identifying the object as the personnel is based on a detected egress or ingress point in the field of view.

16. A non-transitory computer readable storage medium comprising a plurality of instructions executable by one or more processors, the instructions comprising instructions which, when executed on the one or more data processors, cause the one or more data processors to perform actions including:

acquiring visual data from at least one camera positioned on a drilling site, wherein the drilling site comprises a drilling rig and one or more pieces of equipment associated with the drilling rig;

analyzing the visual data from the at least one camera, the visual data comprising a field of view of at least a portion of the drilling site;

identifying an object as personnel in the field of view from the visual data;

estimating a location of the personnel responsive to the identification of the object as personnel;

tracking the location of the personnel as the personnel moves within the field of view;

generating a display comprising at least one marking corresponding to the tracked location of the personnel; and removing the at least one marking from the display when no personnel detections have occurred within a time period.

17. The non-transitory computer readable storage medium of claim 16, wherein the at least one marking comprises a first marking representing the detected personnel and a second marking representing an estimated location of the detected personnel on a ground plane.

18. The non-transitory computer readable storage medium of claim 16, wherein the instructions further comprise instructions which, when executed on the one or more data processors, cause the one or more data processors to perform actions including:

changing a characteristic of the at least one marking based on the tracked location of the personnel.

19. The non-transitory computer readable storage medium of claim 16, wherein the instructions further comprise instructions which, when executed on the one or more data processors, cause the one or more data processors to perform actions including:

identifying the object as the personnel is based on a detected egress or ingress point in the field of view.

* * * * *